United States Patent [19]

Langford

[11] 4,152,950

[45] May 8, 1979

[54] DIFFERENTIAL AND PUSH-PULL CONTROL SYSTEM

[75] Inventor: William D. Langford, Stow, Ohio

[73] Assignee: Incom International Inc., Pittsburgh, Pa.

[21] Appl. No.: 795,534

[22] Filed: May 10, 1977

[51] Int. Cl.² .................... G01M 1/168; G01P 3/20
[52] U.S. Cl. ................ 74/471 XY; 74/501 R; 74/473 R; 74/479; 74/484 R; 74/491
[58] Field of Search ........... 74/501 R, 501 S, 471 R, 74/471 XY, 473 R, 479, 480 R, 484 R, 491

[56] References Cited

U.S. PATENT DOCUMENTS

| | | | |
|---|---|---|---|
| 2,561,558 | 7/1951 | Bright | 74/491 X |
| 2,618,447 | 11/1952 | Lecarme | 74/491 UX |
| 3,541,876 | 11/1970 | Gressard | 74/471 R |
| 3,541,877 | 11/1970 | Houk | 74/471 R |
| 3,590,934 | 7/1971 | Wappler et al. | 74/471 XY X |
| 3,604,284 | 9/1971 | Houk | 74/471 |
| 3,611,827 | 10/1971 | Bottum et al. | 74/471 |
| 3,620,096 | 11/1971 | Scolari | 74/491 X |
| 3,625,302 | 12/1971 | Lauck | 74/471 XY X |
| 3,808,907 | 5/1974 | Yamaguchi | 74/501 R X |
| 3,831,633 | 8/1974 | Comer | 74/471 XY X |
| 3,891,042 | 6/1975 | Braun | 74/471 XY X |
| 3,936,014 | 2/1976 | Morin | 74/491 X |
| 4,060,005 | 11/1977 | Bost | 74/471 XY X |

FOREIGN PATENT DOCUMENTS

| | | | |
|---|---|---|---|
| 819801 | 9/1951 | Fed. Rep. of Germany | 74/471 |
| 2317667 | 10/1973 | Fed. Rep. of Germany | 74/471 XY |
| 148360 of | 1915 | United Kingdom | 74/471 |

Primary Examiner—Samuel Scott
Assistant Examiner—Don E. Ferrell
Attorney, Agent, or Firm—James C. Wray

[57] ABSTRACT

A two cable differential and push-pull system uses both cables simultaneously to operate a controlled device. The two cables are tensioned together or pushed together, or one cable is tensioned while the other is pushed, to operate a single device. Controls which have used separate cables for separate functions use paired cables for the multiple functions, reducing stress on individual cables without increasing the number of cables in the installation. In the illustrated transmission control a differential motion, which includes pushing and pulling forces, is applied through the cables to select a rail. A coincident pushing or pulling force is applied through both cables to shift the rail.

23 Claims, 5 Drawing Figures

DIFFERENTIAL AND PUSH-PULL CONTROL SYSTEM

BACKGROUND OF THE INVENTION

This invention relates generally to push-pull control systems and more particularly has reference to a differential push-pull control system comprising a single control and a single operator used in combination with a pair of push-pull cables.

DESCRIPTION OF THE PRIOR ART

Pertinent United States and foreign patents are found in class 74, subclasses 469, 470, 471R, 471XY, 473R, 473P, 473SW, 475, 476, 477, 479, 491, 501R, 501M, 501P, 502, 503, 504, 505 and 506, the official classifications of patents in the United States Patent and Trademark Office.

Examples of pertinent patents are U.S. Pat. Nos. 2,308,669, 3,063,303, 3,370,480, 3,541,876, 3,541,877, 3,605,284, 3,611,827, 3,625,302, 3,705,519, 3,792,744, 3,899,934 and 3,891,042.

A number of problems remain in prior art push-pull control systems.

No prior art patent discloses a pair of cables connected to a single control and to a single controlled device, wherein the cables move together to translate the controlled device and move differentially to rotate the controlled device. The prior art technique has used a single control and a pair of push-pull cables to perform distinct functions and to operate separate devices.

It is a common practice in manual change gearboxes to have a form of gearstick universally pivotted such that it can rotate about two mutually perpendicular axes.

Side to side movements of the handgrip are used to select one of several gear engaging forks, while forward or backward movement similarly cause the forks to engage or disengage the relative gear mesh. Such mechanisms directly mounted to gearboxes are common enough and are also adapted for remote control by many different systems, which may comprise rigid links or torque tubes which are arranged to slide and twist.

One method of doing this is to use one cable to perform the shift function and a second cable to select the appropriate gear engaging fork. This practice is at once obvious and not efficient in absolute terms since one cable is always redundant to the movement being effected by the other cable.

SUMMARY OF THE INVENTION

The present invention overcomes many of the problems which exist in the prior art devices. The present invention provides, in a preferred form, a two cable differential and push-pull system which uses two cables simultaneously to operate a controlled device. The two cables are tensioned together or pushed together to move the controlled device in one mode. The cables are moved differentially in parallel or opposite directions to move the controlled device in another mode. The present invention has the the advantage of reducing stress on individual cables without increasing the number or size of cables in the entire installation.

The invention uses both cables simultaneously by adopting paired cable movement for the shift function and differential cable movement for the select function or vice versa.

One advantage of this arrangement is that since the load is shared between two cables elastic strain is halved. Another advantage is that longer life results from the specific reduction in cable loading.

Another advantage in the new construction is that paired control cables run adjacent to each other and may be routed most conveniently along the required path between a gearbox and a manual lever.

A feature of the mechanism is a form of bridge piece with one control cable operatively connected to each end.

In one embodiment, differential movements of the two control cables cause this bridge to rotate about its center, while paired movement of the cables cause both ends of the bridge piece to move equally in the same direction.

OBJECTS OF THE INVENTION

Objects of the invention are, therefore, to provide a differential push-pull control system having a single control and a single multifunction controlled device and to provide a differential push-pull control system wherein stress is reduced on individual cables without increasing the number or size of cables in the entire installation.

Another object of the invention is to provide a differential push-pull control apparatus having a controlled device, plural links connected to the controlled device at spaced connections, support means connected to the device for supporting movement of the device in a first mode upon paired coincident movement of the links and movement of the device in a second mode upon differential relative movement of the links, and controlling means connected to the links remote from the controlled device for selectively coincidentally moving the links and differentially relatively moving the links.

Still another object of the invention is to provide a transmission shifting assembly connected to said controlled device, the device positioned for selectively moving the transmission shifting assembly.

Yet another object of the invention is to provide a second controlled device, second plural links connected to the second controlled device at spaced connections, second support means connected to the second device for supporting movement of the second device in a first mode upon coincident paired movement of the second links and movement of the second device in a second mode upon a differential relative movement of the second links, the said controlling means further connected to the second links remote from the second controlled device for selectively coincidentally moving the second links and differentially relatively moving the second links, the means connected to the links and to the second links for differentially relatively moving the second links and the links.

An object of the present invention is to remotely control a manual gearbox through the medium of two flexible control cables of the type in which a push-pull core is translated within a flexible guiding conduit.

These and other further objects and features of the invention are apparent in the disclosure which includes the above and below specifications and claims and drawings.

DETAILED DESCRIPTION OF THE DRAWINGS

Figure 1:
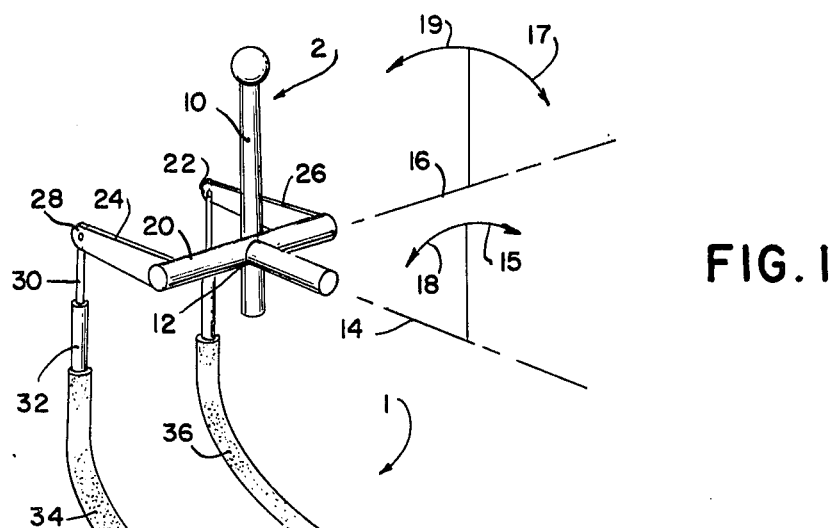
FIG. 1 is a perspective schematic view of a differential push-pull system embodying the principles of the present invention.

Referring to FIG. 1, a differential push-pull control system 1 comprises an operator 2, a pair of push-pull cables 3, and a controlled device 4. The operator 2 acts on the cables 3 to selectively coincidentally push the cables 3, coincidentally pull the cables 3, and differentially relatively move the cables 3. The cables 3 communicate the actuating force applied by the operator 2 to the controlled device 4. The controlled device 4 is translationally moved or rotated, whereby the transmission shifting assembly 6 connected to the controlled device 4 shifts a rail 64, 66 and 68 or selects a rail 64, 66 and 68.

The operator 2 has a control lever 10 connected to a control beam 20. The beam is supported for rotation both about an axis 16 of the beam 20 and about normal axis 14. Outwardly extending arms 24 and 26 are connected to the beam 20 at spaced connections. The outward ends 22 and 28 of arms 24 and 26 are connected to the cables 3.

The cables 3, in a preferred form, comprise a pair of flexible cores 30 and 44 slidably mounted in separate guiding conduits 34 and 36. Guide tubes 32 and 42 terminate the conduits 34 and 36.

In an alternative embodiment, a single conduit having two coaxial cores is substituted for the separate coaxial cables shown in FIG. 1.

In another embodiment, a single coaxial cable is substituted for the pair of coaxial cables shown in FIG. 1. With such an arrangement, both the coaxial cable and conduit are slidable, each performing the function of one of the flexible cables 30 and 44 shown in FIG. 1.

In the preferred embodiment, the flexible cables 30 and 44 are connected to the outward ends 28 and 22 of the operator arms 24 and 26. When the control lever 10 is moved in the direction indicated by numeral 17, the beam 20 rotates about its own axis 16 causing the arms 28 and 22 to coincidentally pull the cables 30 and 44. When the control lever 10 is moved in the direction indicated by numeral 19, the beam 20 rotates about its own axis 16 in the opposite direction, causing the arms 24 and 26 to coincidentally push the cables 30 and 44. When the control lever 10 is moved in the direction indicated by numeral 15, the beam 20 rotates about axis 14 normal to its own axis 16 and causes the arm 24 to pull on the cable 30 and causes the arm 26 to push on the cable 44. Similarly, when the control lever 10 moves in the direction indicated by numeral 18, the beam 20 rotates in the opposite direction about axis 14 normal to its own axis, causing the arm 24 to push the cable 30 and causing the arm 26 to pull the cable 44.

In FIG. 1, the flexible cables 30 and 44 are connected to a controlled device 4, illustrated schematically. The cables 30 and 44 are connected to a control member 54 at spaced connections 46 and 48. The control member 54 is supported for rotational and translational movement. The rail selector 56 of a transmission shifting assembly 6 shown schematically in FIG. 1 is connected to the control member 54. The selector 56 is supported for rotation about pivot rod 57 to enable the selector 56 to be selectively received within the slot 62, 60 and 58 of the desired transmission rail 64, 66 and 68.

Movement of the control lever 10 in a direction indicated by numeral 15 or 18 causes a differential relative movement of the flexible cables 30 and 44 in a manner already described. This differential movement causes the control member 54 to rotate about an axis parallel to the axis of the rail selector 56. This, in turn, causes the selector 56 to rotate about the pivot rod 57 and causes the lower end of the rail selector 56 to select the desired rail 64, 66 and 68. On the other hand, when the control lever 10 is moved in a direction indicated by numeral 17 or 19, the cables 30 and 44 are coincidentally pulled or pushed in a manner previously described. This coincident movement causes the control member 54 to move transversely in a direction of arrow 50. The selector 56 communicates this transverse movement to the selected rail 64, 66 and 68, thereby shifting the rail 64, 66 and 68.

Figure 2:
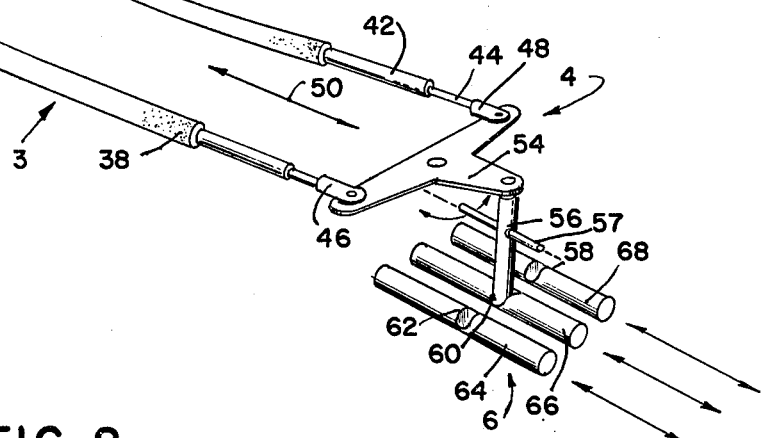
FIG. 2 is a perspective view of a transmission shifting assembly used in combination with the cables and control of the present invention.
Figure 2:
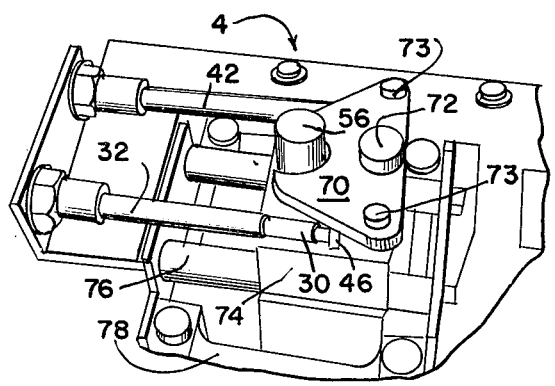
Figure 3:
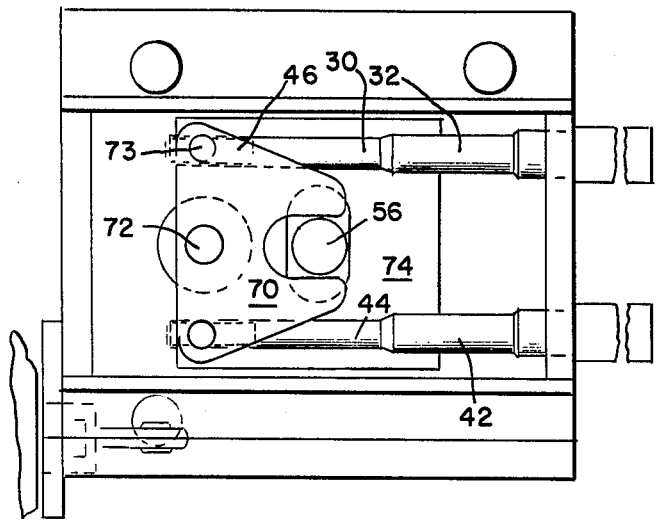
FIG. 3 is a top plan view of the combination shown in FIG. 2.
Figure 4:
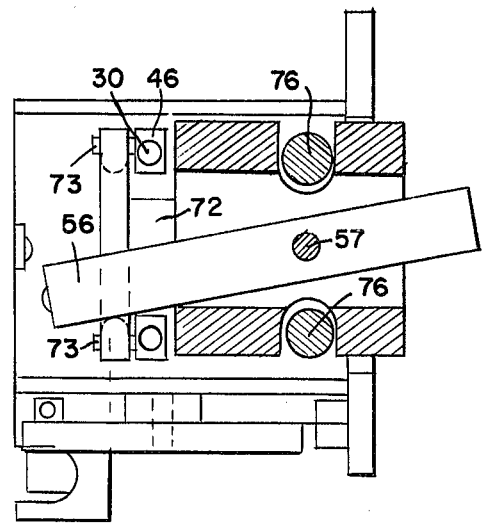
FIG. 4 is a side elevation, in section, of the combination shown in FIG. 3 in which the selector 56 has been moved to one side.

In other embodiments, elements 4 and 2 are interchangeable. FIGS. 2, 3 and 4 show a preferred embodiment of a transmission shifting assembly in combination with a control assembly 4 constructed according to the present invention. A chassis 78 mounted on a transmission adjacent a transmission shifting assembly slidably supports a block 74 on slide rails 76. A plate 70 having a semicircular recess positioned to engage the rail selector 56 is rotatably supported on the block 74 by a pivot mount 72. The cable conduit guide tubes 32 and 42 are rigidly connected to the chassis 78 at spaced connections. The flexible cable cores 30 and 44 project from the ends of the conduits 32 and 42 and are connected to movable mountings 46 and 48. The movable mountings 46 and 48 are slidably supported by the block 74 and have axial portions 73 which are rotatably received within spaced bores in the plate 70.

The mountings 46 and 48 enable the plate 70 to rotate freely about the pivot mount 72 when differential relative movement is communicated from the flexible cable cores 30 and 44 to the mountings 46 and 48. The recess on the rotating plate 70 engages the rail selector 56 causing the selector 56 to rotate about the pivot rod 57 (FIG. 1), thereby selecting the desired rail 64, 66 and 68 in a manner previously described. On the other hand, a coincident movement of the cable cores 30 and 44 causes a transverse displacement of the block 74 along the slide rails 76. A slot in block 74 engages the selector 56 causing the selector 56 to move transversely with the block 74, thereby shifting the rail 64, 66 and 68.

The advantage of using the present invention in any installation requiring two dimensional control movement is readily apparent. The simplicity of operation of the present invention is now appreciated. Referring to FIG. 1, movement of the control lever 10 in the direction indicated by numeral 17 shifts the selected rail 66. Movement of the lever in the direction indicated by numeral 19 shifts the same rail 66 oppositely. From the position shown in FIG. 1, movement of the lever 10 in the direction indicated by numeral 15 selects the rail 68. Movement of the lever 10 in the direction indicated by numeral 18 returns the selector 56 to the center rail 66 or the rail 64.

Figure 5:
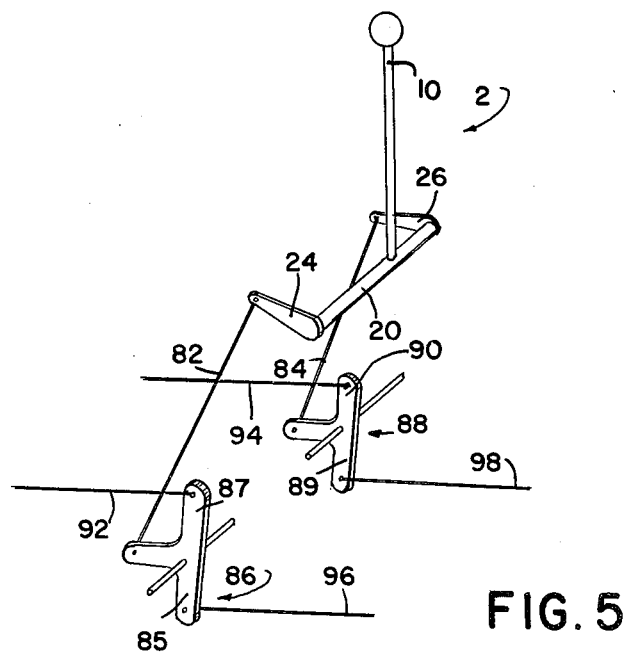
FIG. 5 is a schematic perspective view of an alternative embodiment of the present invention.

FIG. 5 shows another embodiment of the present invention wherein the operator 2 is adapted to simultaneously and coordinately operate two controlled devices, both the operator and controlled devices having the features of the present invention. Operator arms 24 and 26 are connected to rotatable levers 86 and 88 by links or push pull cables 82 and 84. The levers 86 and 88 have oppositely projecting arms 85 and 87 and 89 and 90. One arm 87 and 90 on each lever 86 and 88 is connected to a single controlled device by push-pull cables 92 and 94. The opposite arm 85 and 89 on each lever 86 and 88 is connected to another controlled device by push-pull cables 96 and 98. Coincident pulling forces applied to the operator arms 24 and 26 and to links 82 and 84 result in coincident pulling forces on the control cables 92, 94, 96, and 98. Similarly, coincident pushing forces applied to the operator arm links 82 and 84 result in coincident pushing forces on the control cables 92, 94, 96 and 98. Differential relative movement applied to the operator arm cables 82 and 84 result in differential relative movement of the control cables 92 and 94 and 96 and 98 connected to each controlled device.

While the invention has been described with reference to a specific embodiment, the exact nature and scope of the invention is defined in the following claims.

I claim:

1. Differential push-pull control apparatus comprising a controlled device, plural push-pull links connected to the controlled device at spaced connections, support means connected to the device for supporting movement of the device in a first mode upon paired coincident movement of the links and movement of the device in a second mode upon differential relative movement of the links, and controlling means connected to the links remote from the controlled device for selectively coincidentally moving the links and differentially relatively moving the links.

2. The apparatus of claim 1 wherein the controlling means comprise means connected to the links for selectively coincidentally pushing the links, coincidentally pulling the links, and differentially relatively moving the links.

3. The apparatus of claim 1 further comprising a transmission shifting assembly connected to the controlled device, the device positioned for selectively moving the transmission shifting assembly.

4. The apparatus of claim 1 further comprising a transmission connected to the controlled device, a transmission shifting assembly connected to the transmission, the device positioned for selectively engaging and moving the transmission shifting assembly.

5. The apparatus of claim 1 further comprising a transmission connected to the support means, pivot means, and controlled device, a transmission shifting assembly connected to the transmission, the device positioned for selectively engaging and moving the transmission shifting assembly.

6. The apparatus of claim 1 wherein the links are push-pull control cables.

7. The apparatus of claim 1 wherein the controlling means comprise a control means, outwardly extending arms on the control means at spaced connections and to the links, means connected to the control means for supporting movement of the beam both about a first axis and about a second axis transverse to the first axis, and a control arm connected to the means for selectively moving the control means.

8. A differential push-pull control apparatus comprising a controlled device, plural links connected to the controlled device at spaced connections, support means connected to the device for supporting translational movement of the device upon coincident movement of the links, pivot means connected to the support means and to the device for supporting rotational movement of the device upon differential relative movement of the links, and controlling means connected to the links remote from the controlled device for selectively coincidentally moving the links and differentially relatively moving the links.

9. The apparatus of claim 8 wherein the support means comprise sliding support means connected to the device for supporting translational sliding movement of the device upon coincident movement of the links.

10. The apparatus of claim 8 wherein the controlling means comprise means connected to the links for selectively coincidentally pushing the links, coincidentally pulling the links, and differentially relatively moving the links.

11. Differential push-pull control apparatus comprising a controlled device, plural links connected to the controlled device at spaced connections, a sliding support means connected to the device for supporting translational sliding movement of the device upon coincident movement of the links, pivot means connected to the sliding support means and to the controlled device for supporting turning of the controlled device upon differential relative movement of the links, and a controlling means connected to the links remote from the controlled device for selectively coincidentally pushing the links, coincidentally pulling the links and differentially relatively moving the links.

12. The apparatus of claim 8 further comprising a transmission shifting assembly connected to the controlled device, the device positioned for selectively moving the transmission shifting assembly.

13. The apparatus of claim 8 further comprising a transmission connected to the controlled device, a transmission shifting assembly connected to the transmission, the device positioned for selectively engaging and moving the transmission shifting assembly.

14. The apparatus of claim 8 further comprising a transmission connected to the support means, pivot means, and controlled device, a transmission shifting assembly connected to the transmission, the device positioned for selectively engaging and moving the transmission shifting assembly.

15. The apparatus of claim 8 wherein the links are push-pull control cables.

16. The apparatus of claim 8 further comprising a second controlled device, second plural links connected to the second controlled device at spaced connections, second support means connected to the second device for supporting translational movement of the second device upon coincident movement of the second links, second pivot means connected to the second support means and to the second device for supporting rotational movement of the second device upon differential relative movement of the second links, the controlling means further connected to the second links remove from the second controlled device for selectively coincidentally moving the second links and differentially relatively moving the second links.

17. The apparatus of claim 8 wherein the controlling means comprise a control beam, outwardly extending arms connected to the beam at spaced connections and to the links, means connected to the beam for supporting rotation of the beam both about an axis of the beam and about an axis transversely thereof, and a control arm connected to the beam for selectively rotating the beam.

18. The apparatus of claim 16 wherein the controlling means comprise means connected to the links and to the second links for differentially moving the second links and the links.

19. The apparatus of claim 16 wherein the controlling means comprise means connected to the links and to the second links for coincidentally pushing the links and second links, and coincidentally pulling the links and second links.

20. A differential push-pull control apparatus comprising first and second devices, plural push-pull links connected between the devices at spaced connections, support means connected to the first device for supporting translational movement of the first device in a first direction upon coincident movement of the links, means connected to the support means and to the first device for supporting movement of the first device in a direction transverse to the first direction upon differential relative movement of the links, and the second device connected to the links remote from the first device for selectively coincidentally moving the links and differentially relatively moving the links.

21. The apparatus of claim 20 wherein the support means comprise sliding support means connected to the first device for supporting translational sliding movement of the first device upon coincident movement of the links.

22. The apparatus of claim 20 wherein the second device comprise means connected to the links for selectively coincidentally pushing the links, coincidentally pulling the links, and differentially relatively moving the links.

23. Differential push-pull control apparatus of claim 20 wherein the support means is connected to the first device for supporting translational sliding movement of the first device upon coincident movement of the links, and pivot means connected to the support means and to the first device for supporting turning of the first device upon differential relative movement of the links.

* * * * *